United States Patent
Lu et al.

(10) Patent No.: US 10,116,343 B2
(45) Date of Patent: *Oct. 30, 2018

(54) MULTI-MIXER SYSTEM AND METHOD FOR REDUCING INTERFERENCE WITHIN MULTI-MIXER SYSTEM

(71) Applicant: MEDIATEK INC., Hsin-Chu (TW)

(72) Inventors: Ying-Tsang Lu, Hsinchu County (TW); Yen-Hung Kuo, New Taipei (TW); Yuan-Yu Fu, Hsinchu County (TW); Chinq-Shiun Chiu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,199

(22) Filed: Sep. 11, 2017

(65) Prior Publication Data

US 2018/0013458 A1 Jan. 11, 2018

Related U.S. Application Data

(63) Continuation of application No. 15/163,687, filed on May 25, 2016, now Pat. No. 9,793,935.
(Continued)

(51) Int. Cl.
*H04B 7/08* (2006.01)
*H04B 1/10* (2006.01)
(Continued)

(52) U.S. Cl.
CPC ......... *H04B 1/1018* (2013.01); *H04B 1/1036* (2013.01); *H04B 1/1607* (2013.01); *H04B 15/06* (2013.01); *H04B 1/0053* (2013.01)

(58) Field of Classification Search
CPC .... H04B 1/005; H04B 1/0053; H04B 1/0057; H04B 1/006–1/0089
See application file for complete search history.

(56) References Cited

U.S. PATENT DOCUMENTS 5,122,878 A * 6/1992 Heigl .................. H03J 5/244
348/725
6,029,052 A 2/2000 Isberg
(Continued)

FOREIGN PATENT DOCUMENTS

| CN | 104734640 A | 6/2015 |
| EP | 2 677 665 A1 | 12/2013 |
| JP | 2009182928 A | 8/2009 |

OTHER PUBLICATIONS

Mikhemar, "A Cancellation Technique for Reciprocal-Mixing Caused by Phase Noise and Spurs", IEEE Journal of Solid-State Circuits, vol. 48, No. 12, Dec. 2013.

*Primary Examiner* — Duc M Nguyen
(74) *Attorney, Agent, or Firm* — Winston Hsu

(57) ABSTRACT

A multi-mixer system includes an amplifier module and a plurality of channels. The amplifier module is arranged for receiving signals from an antenna or antenna arrays to generate a plurality of radio frequency (RF) input signals. The plurality of channels are coupled to the amplifier module, wherein the plurality of channels receive the RF input signals, respectively, and each of the channels includes a mixer for mixing one of the RF input signals with a local oscillating signal to generate a mixed signal. In addition, at least one of the channels includes an interference reduction circuit positioned between the amplifier module and the mixer.

17 Claims, 8 Drawing Sheets

Related U.S. Application Data

(60) Provisional application No. 62/188,107, filed on Jul. 2, 2015.

(51) Int. Cl.
  *H04B 15/06* (2006.01)
  *H04B 1/16* (2006.01)
  *H04B 1/00* (2006.01)

(56) References Cited

U.S. PATENT DOCUMENTS

| | | | |
|---|---|---|---|
| 7,432,989 B2 | 10/2008 | Yamamoto | |
| 2003/0003891 A1 | 1/2003 | Kivekas | |
| 2004/0014435 A1* | 1/2004 | Woo | H03D 7/165 455/103 |
| 2004/0145410 A1* | 7/2004 | Selz | H03H 7/0161 330/107 |
| 2004/0209590 A1 | 10/2004 | Forrester | |
| 2005/0085201 A1* | 4/2005 | Martin | H04B 1/005 455/168.1 |
| 2006/0154636 A1 | 7/2006 | Shah | |
| 2007/0207752 A1* | 9/2007 | Behzad | H04B 1/18 455/132 |
| 2008/0079514 A1 | 4/2008 | Prikhodko | |
| 2008/0132192 A1* | 6/2008 | Lim | H04B 1/0064 455/315 |
| 2008/0178227 A1* | 7/2008 | Petrovic | H04B 1/28 725/68 |
| 2010/0048240 A1 | 2/2010 | Yanduru | |
| 2011/0136455 A1 | 6/2011 | Sundstrom | |
| 2012/0171968 A1* | 7/2012 | Poulin | H04B 1/006 455/78 |
| 2012/0214543 A1 | 8/2012 | Behzad | |
| 2012/0230252 A1 | 9/2012 | Yang | |
| 2013/0028352 A1* | 1/2013 | Leenaerts | H03D 7/163 375/316 |
| 2013/0039444 A1* | 2/2013 | Porret | H04B 1/0007 375/316 |
| 2013/0222075 A1 | 8/2013 | Reedy | |
| 2013/0271213 A1 | 10/2013 | Chung | |
| 2014/0170999 A1 | 6/2014 | Aparin | |
| 2015/0333949 A1* | 11/2015 | Tasic | H04L 27/2653 370/329 |

* cited by examiner

MULTI-MIXER SYSTEM AND METHOD FOR REDUCING INTERFERENCE WITHIN MULTI-MIXER SYSTEM

CROSS REFERENCE TO RELATED APPLICATION

This is a continuation of the co-pending U.S. application Ser. No. 15/163,687 (filed on May 25, 2016), which claims the benefit of U.S. provisional application 62/188,107 (filed on Jul. 2, 2015). The entire content of the related applications is incorporated herein by reference.

BACKGROUND

In a multi-mixer system, a local oscillating signal used by a mixer may be coupled to others mixer, causing interference to the other mixers. In a multi-mixer system, there're more than one operating mixer and the local oscillating signal and its harmonics of one of the mixers can be an interference of other mixers. The interference can result in a de-sensitization of a receiver and results in unsatisfied signal quality in a communication system. Therefore, how to provide an interference reduction mechanism to lower the interference between mixers is an important topic.

SUMMARY

It is therefore an objective of the present invention to provide a method for reducing interference within a multi-mixer system, to solve the above-mentioned problem.

According to one embodiment of the present invention, a multi-mixer system comprises an amplifier module and a plurality of channels. The amplifier module is arranged for receiving signals from an antenna to generate a plurality of radio frequency (RF) input signals. The plurality of channels are coupled to the amplifier module, wherein the plurality of channels receive the RF input signals, respectively, and each of the channels comprises a mixer for mixing one of the RF input signals with an local oscillating signal to generate a mixed signal. In addition, at least one of the channels comprises an interference reduction circuit positioned between the amplifier module and the mixer.

According to another embodiment of the present invention, a method for reducing interference within a multi-mixer system is provided, where the multi-mixer system comprises an amplifier module and a plurality of channels. The amplifier module is arranged for receiving signals from an antenna to generate a plurality of radio frequency (RF) input signals. The plurality of channels are coupled to the amplifier module, wherein the plurality of channels receive the RF input signals, respectively, and each of the channels comprises a mixer for mixing one of the RF input signals with a local oscillating signal to generate a mixed signal. In addition, at least one of the channels comprises an interference reduction circuit positioned between the amplifier module and the mixer. The method comprises: reducing an interference of the oscillating signal between the amplifier module and the mixer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
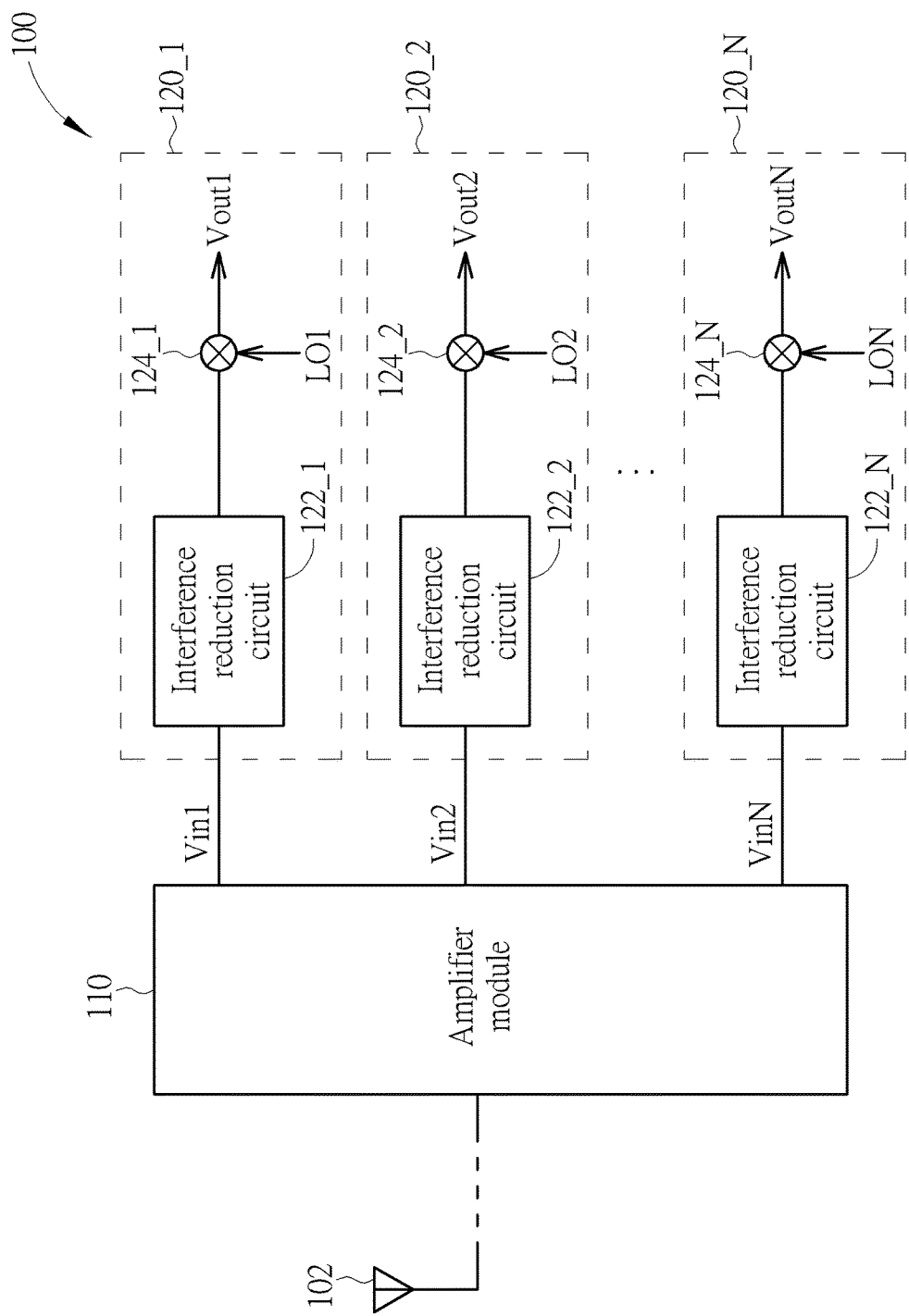
FIG. 1 is a diagram illustrating a system according to one embodiment of the present invention.

Please refer to FIG. 1, which is a diagram illustrating a system 100 according to one embodiment of the present invention. As shown in FIG. 1, the system 100 comprises at least an antenna 102 (or an antenna array), an amplifier module 110 and a plurality of channels 120_1-120_N, where the channel 120_1 comprises an interference reduction circuit 122_1 and a mixer 124_1, the channel 120_2 comprises an interference reduction circuit 122_2 and a mixer 124_2, and the channel 120_N comprises an interference reduction circuit 122_N and a mixer 124_N. In this embodiment, the system 100 may be a Long Term Evolution (LTE) receiver.

In this embodiment, the system 100 is a receiver or a transceiver, and is arranged to receive radio frequency (RF) signal from the antenna 102 to generate at least one mixed signal (e.g. intermediate frequency (IF) signal) for further processing. In detail, the amplifier module 110 receives a signal from an antenna to generate a plurality of RF input signals Vin1-VinN, and the mixers 124_1-124_N mix the RF input signals Vin1-VinN with oscillation signals LO1-LON to generate IF signals Vout1-VoutN, respectively. In FIG. 1, the oscillation signals LO1-LON have different frequencies.

Figure 2:
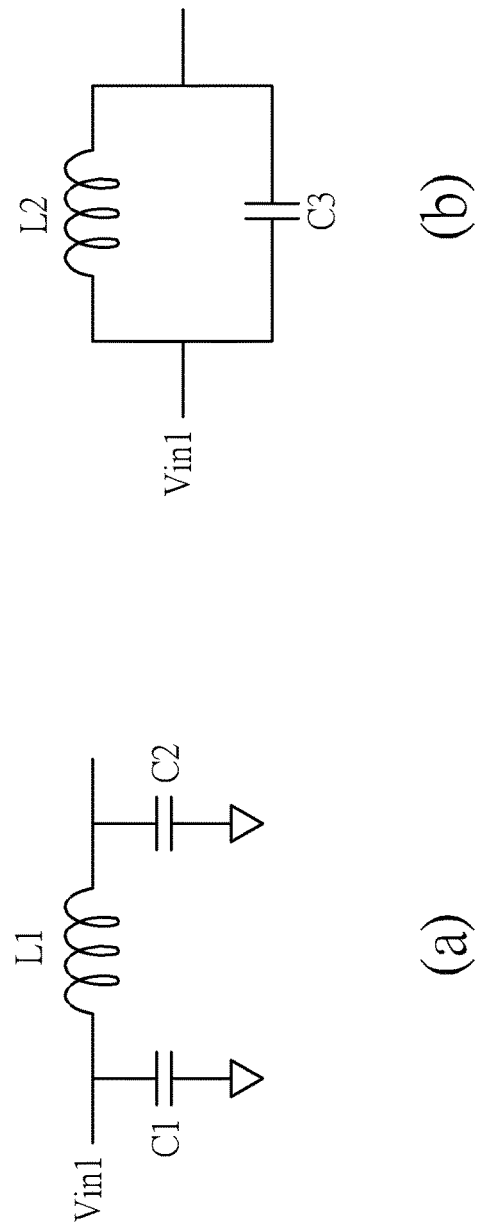
FIG. 2 shows two examples of the interference reduction circuit.
Figure 3:
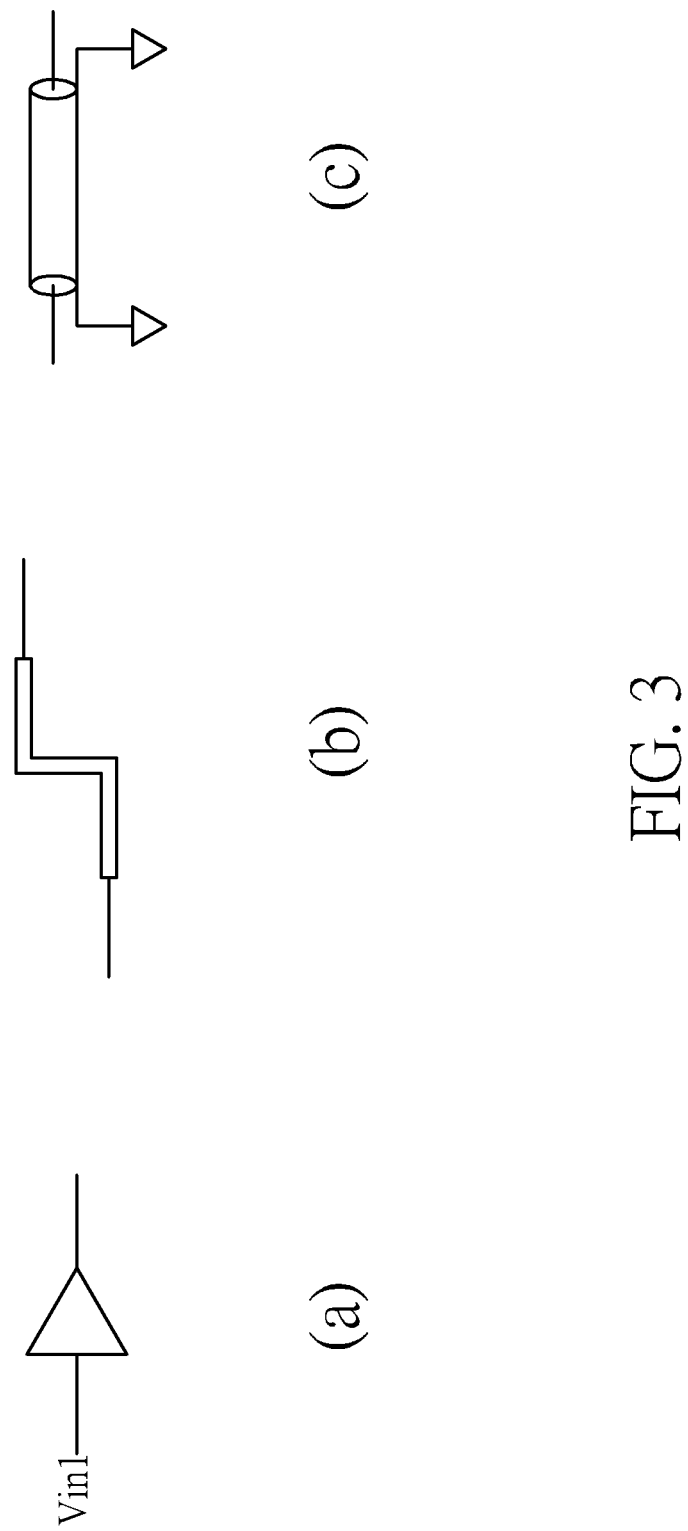
FIG. 3 shows three examples of the interference reduction circuit.

In the system 100 shown in FIG. 1, each of the interference reduction circuits 122_1-122_N is arranged to reduce harmonics from the mixer within the same channel to other channels. For example, the interference reduction circuit 122_1 is arranged to reduce harmonics from the mixer 124_1 within the channel 120_1 to the other channels 120_2-120_N, . . . , and the interference reduction circuit 122_N is arranged to reduce harmonics from the mixer 124_N within the channel 120_N to the other channels 120_1-120_(N−1). In several embodiments, the interference reduction circuits 122_1-122_N can be implemented by a bidirectional low-pass filter comprising an inductor L1 and two capacitors C1 and C2, or a bi-directional notch filter comprising an inductor L2 and a capacitor C3 as shown in FIG. 2 (a)-(b), or a bidirectional band-pass filter with tunable frequency response, or the interference reduction circuits 122_1-122_N can be implemented by an amplifier for providing reverse isolation to suppress the leakage of local oscillating signal from a mixer, a conductor line or a transmission line as shown in FIG. 3 (a)-(c), the intrinsic frequency response of a conductor line or transmission line can provide particular suppression at particular frequencies.

Figure 4:
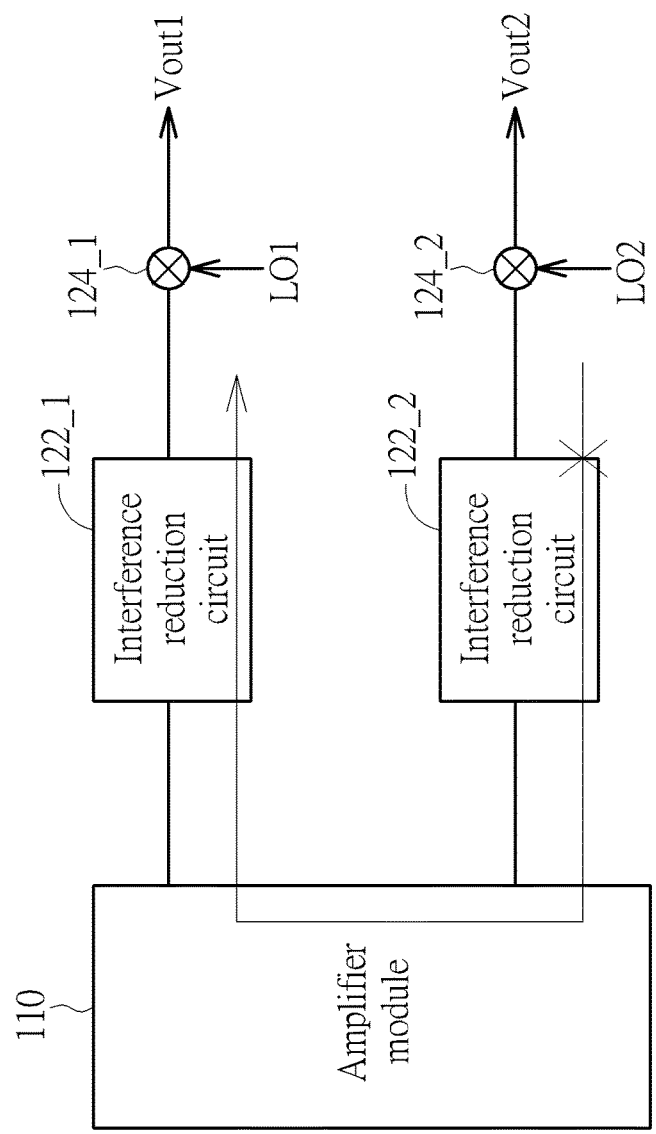
FIG. 4 shows that the harmonics of the oscillating signal LO2 are filtered or isolated from the channel 120_1.
Figure 5:
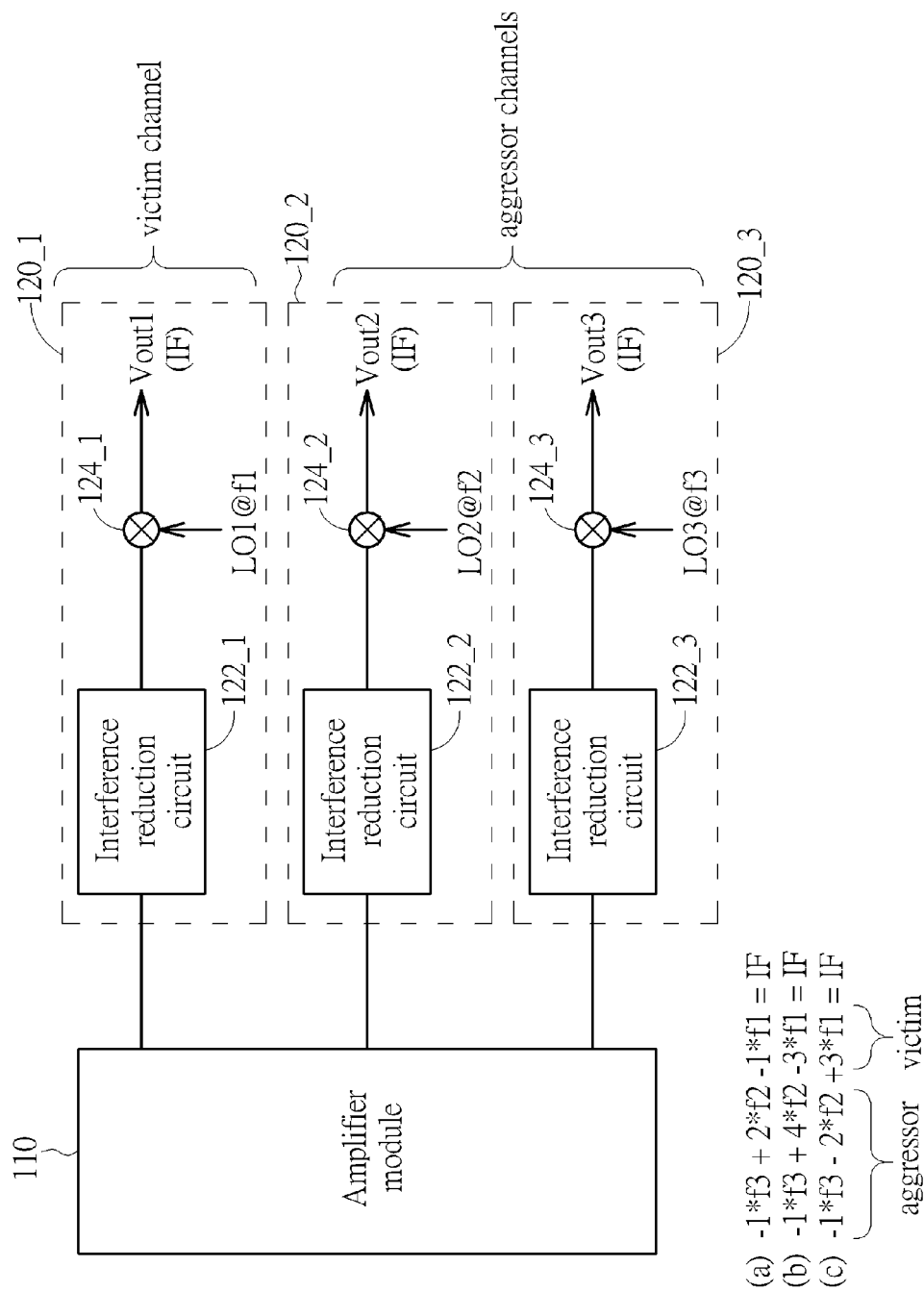
FIG. 5 shows some specific conditions that the harmonics of the oscillating signal LO2 may affect the operations of other channels.

When frequencies of part of the oscillation signals LO1-LON satisfy a specific condition, the mixer 124_1 may be influenced by the other oscillation signals due to the coupling effect if no interference reduction circuit is applied. By using the interference reduction circuit 122_2 positioned before the mixer 124_2 of the channel 120_2, the harmonic of the oscillating signal LO2 can be filtered or isolated from the channel 120_1, thereby the mixer 124_1 will not be interfered by the oscillating signal LO2 as shown in FIG. 4. The specific condition may be that an Nth harmonic of the frequency of the oscillating signal LO1 is substantially equal to a Mth harmonic of the frequency of the oscillating signal LO2 (e.g. LO1=4 GHz, LO2=3 Gz); or the specific condition may be that a summation of harmonics of the frequencies of the oscillation signals is equal to a frequency of an IF signal as shown in FIG. 5. In the example (a)-(c) shown in FIG. 5, when the harmonics of the oscillation signals satisfy the equations: $-1*f3+2*f2-1*f1=IF$, or $-1*f3+4*f2-3*f1=IF$, or $-1*f3-2*f2+3*f1=IF$ (f1, f2 and f3 are frequencies of the L01-L03, respectively), the harmonics of the oscillation signals LO2 and LO3 may affect the operations of the mixer 124_1 if no interference reduction circuit is applied, that is the channels 120_2 and 120_3 are regarded as aggressor channels and the channel 120_1 is regarded as a victim channel if no interference reduction circuit is applied, therefore, by using the interference reduction circuits 122_2 and 122_3 shown in FIG. 5, the harmonic of the oscillation signals LO2 and LO3 can be filtered or isolated from the channel mixer 124_1.

Figure 6:
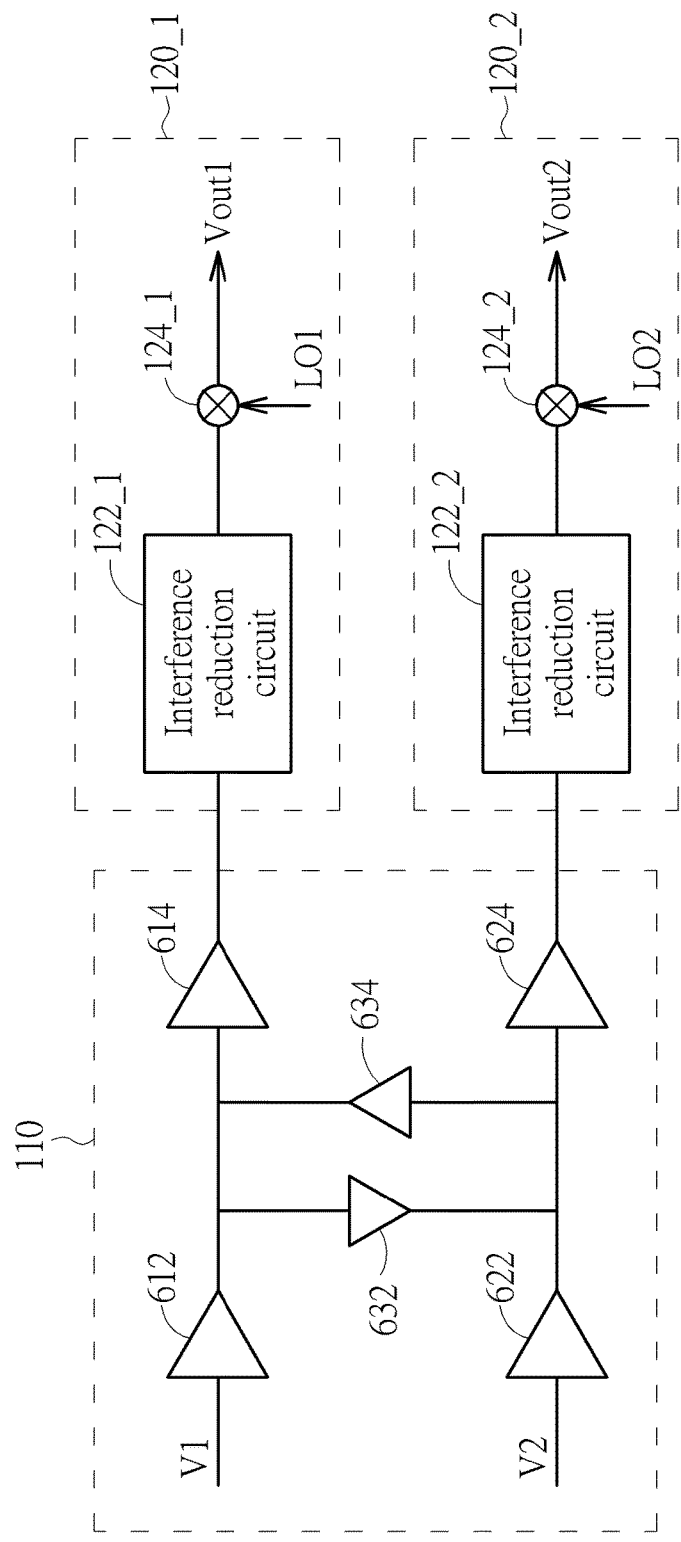
FIG. 6 shows the detailed structure of the amplifier module according to one embodiment of the present invention.

FIG. 6 shows the detailed structure of the amplifier module 110 according to one embodiment of the present invention. As shown in FIG. 6, the amplifier module 110 comprises at least six amplifiers 612, 614, 622, 624, 632 and 634. These amplifiers are arranged to selectively couple the signal V1 to the channel 120_1 or 120_2, and to selectively couple the signal V2 to the channel 120_1 or 120_2. For example, when the signals V1 and V2 are required to be processed by the channels 120_1 and 120_2, respectively, the amplifiers 612, 614, 622 and 624 are enabled, and the amplifiers 632 and 634 are disabled; when the signal V1 is required to be processed by the channel 120_2, the amplifiers 612, 632 and 624 are enabled, and the amplifiers 622, 634 and 614 are disabled; and when the signal V2 is required to be processed by the channel 120_1, the amplifiers 622, 634 and 614 are enabled, and the amplifiers 612, 632 and 624 are disabled.

Figure 7:
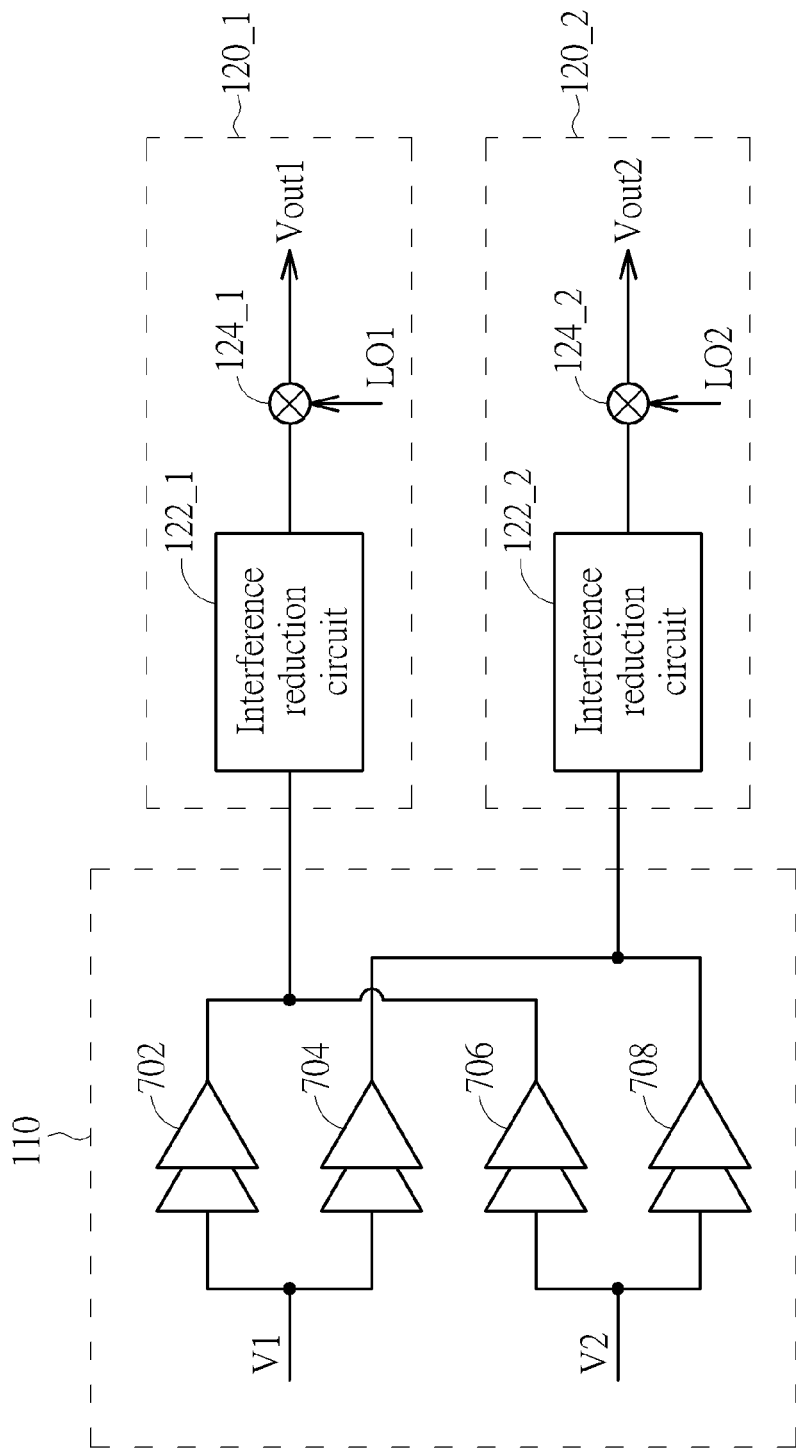
FIG. 7 shows the detailed structure of the amplifier module according to another embodiment of the present invention.

FIG. 7 shows the detailed structure of the amplifier module 110 according to another embodiment of the present invention. As shown in FIG. 7, the amplifier module 110 comprises at least four amplifiers 702, 704, 706 and 708. These amplifiers are arranged to selectively couple the signal V1 to the channel 120_1 or 120_2, and to selectively couple the signal V2 to the channel 120_1 or 120_2. For example, when the signals V1 and V2 are required to be processed by the channels 120_1 and 120_2, respectively, the amplifiers 702 and 708 are enabled, and the amplifiers 704 and 706 are disabled; and when the signals V1 and V2 are required to be processed by the channels 120_2 and 120_1, respectively, the amplifiers 704 and 706 are enabled, and the amplifiers 702 and 708 are disabled.

Figure 8:
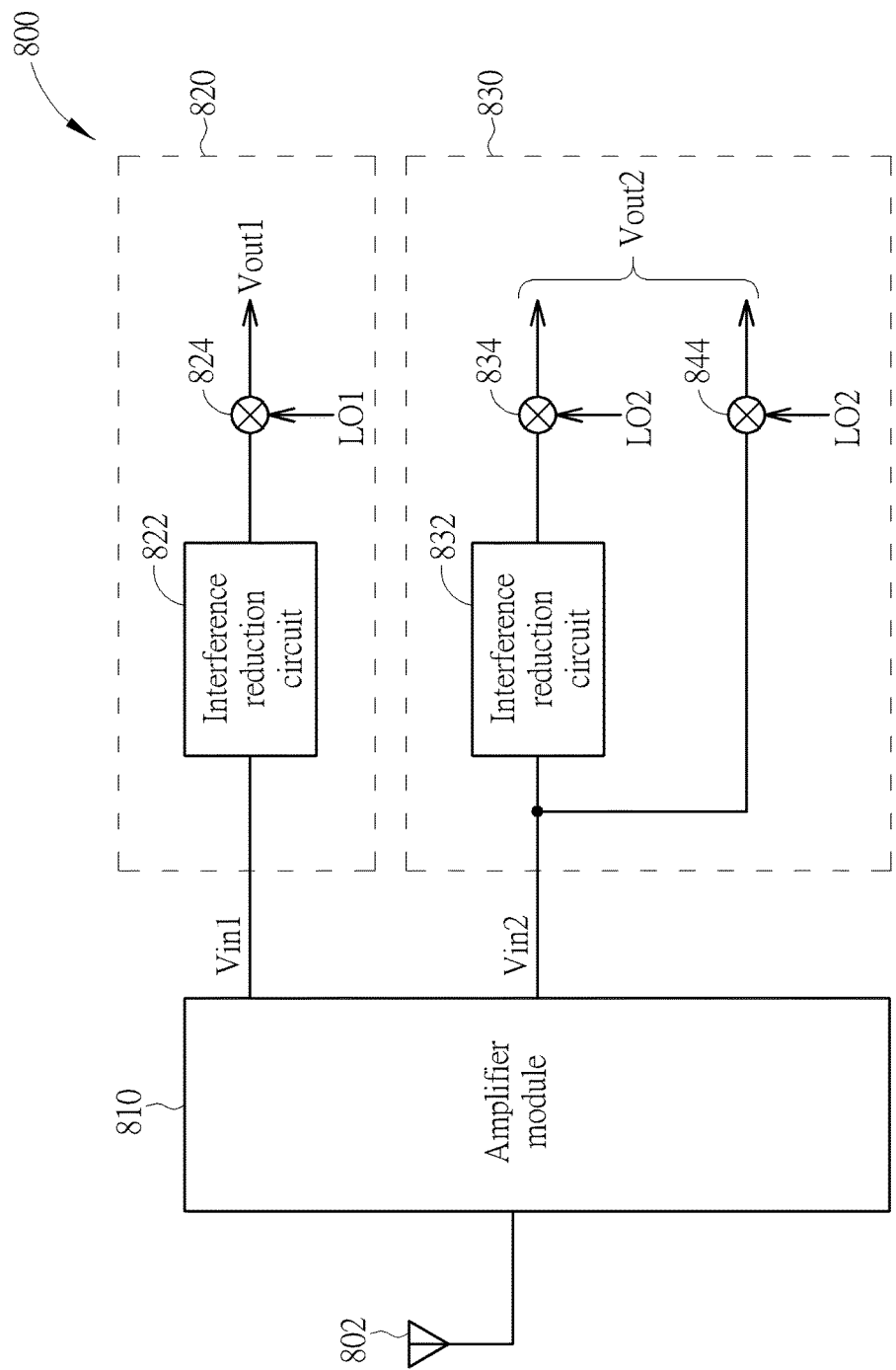
FIG. 8 is a diagram illustrating a system according to one embodiment of the present invention.

Please refer to FIG. 8, which is a diagram illustrating a system 800 according to one embodiment of the present invention. As shown in FIG. 8, the system 800 comprises an antenna 802, an amplifier module 810 and a plurality of channels (in this embodiment, there are two channels 820 and 830), where the channel 820 comprises an interference reduction circuit 822 and a mixer 824; and the channel 830 comprises two sub-channels, where one sub-channel comprises an interference reduction circuit 832 and a mixer 834, and the other sub-channel merely comprises a mixer 844. In this embodiment, the mixers 834 and 844 within the channel 830 use the oscillation signals LO2 with the same frequency, and only one of the mixers 834 and 844 can receive the oscillating signal LO2 at the same time (i.e. only one of the sub-channels is enabled to generate the IF signal).

In this embodiment, the system 800 is a receiver or a transceiver, and is arranged to receive RF signals from the antenna 802 to generate at least one IF signal for further processing. In detail, the amplifier module 810 receives signals from an antenna to generate two RF input signals Vin1-Vin2, and the mixers 824 mixes the RF input signal Vin1 with oscillating signal LO1 to generate the IF signal Vout1, and one of the mixers 834 and 844 within the channel 830 mixes the RF input signal Vin2 with the oscillating signal LO2 to generate the IF signal Vout2.

In the system 800 shown in FIG. 8, the interference reduction circuit 832 is arranged to reduce harmonics from the mixer 834 to the channel 820, and the interference reduction circuit 832 can be implemented by any one of the circuits shown in FIG. 2 and FIG. 3. In the embodiment shown in FIG. 8, although the interference reduction circuit 832 can reduce harmonics from the mixer 834 to the channel 820, it may degrade the performance of the mixer 834. Therefore, the channel 830 shown in FIG. 8 has two sub-channels to selectively process the RF input signal Vin2. In detail, when the oscillating signal LO2 satisfies the specific condition and the harmonics of the oscillating signal LO2 may affect the mixer 824, the mixer 834 is selected to receive the oscillating signal L02, and the RF input signal Vin2 is processed by the interference reduction circuit 832 and the mixer 834 to generate the IF output signal Vout2. On the other hand, when the oscillating signal LO2 does not satisfy the specific condition, that is the harmonics of the oscillating signal LO2 may not affect the mixer 824, in order to have the better performance, the mixer 844 is selected to receive the oscillating signal L02, and the RF input signal Vin2 is processed by the mixer 844 to generate the IF output signal Vout2. In this embodiment, the specific condition may be that an Nth harmonic of the frequency of the oscillating signal LO1 is substantially equal to a Mth harmonic of the frequency of the oscillating signal LO2 (e.g. LO1=4 GHz, LO2=3 Gz); or the specific condition may be that a summation of harmonics of the frequencies of the oscillation signals is equal to a frequency of an IF signal as shown in FIG. 5.

Briefly summarized, in the multi-mixer system of the present invention, by using the interference reduction circuit between the amplifier module and the mixer, harmonics of a local oscillating signal can be filtered or isolated from the other channels, and the performance of the mixers can be improved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multi-mixer system, comprising:
an amplifier module, for receiving signals from at least an antenna to generate at least a first radio frequency (RF) input signal and a second RF input signal; and
a first channel coupled to the amplifier module, wherein the first channel comprises a first mixer and a first interference reduction circuit configured between the amplifier module and the first mixer, and the first channel is used to receive the first RF input signal to generate a first mixed signal; and
a second channel coupled to the amplifier module, wherein the second channel is used to receive the second RF input signal to generate a second mixed signal, the second channel comprises a first sub-channel and a second sub-channel, the first sub-channel comprises a second mixer and a second interference reduction circuit configured between the amplifier module and the second mixer, and the second sub-channel comprises a third mixer;
wherein only one of the first sub-channel and the second sub-channel is enabled to generate the second mixed signal, and when an oscillating signal used by the second mixer or the third mixer satisfies a specific condition, the first sub-channel is enabled to generate the second mixed signal, and the second sub-channel is disabled; and when the oscillating signal used by the second mixer or the third mixer does not satisfy the specific condition, the first sub-channel is disabled, and the second sub-channel is enabled to generate the second mixed signal.

2. The multi-mixer system of claim 1, wherein oscillation signals used by the second mixer and the third mixer have a same frequency.

3. The multi-mixer system of claim 1, wherein only one of the first sub-channel and the second sub-channel is enabled to generate the second mixed signal.

4. The multi-mixer system of claim 1, wherein no interference reduction circuit is configured between the amplifier module and the third mixer of the second sub-channel.

5. The multi-mixer system of claim 4, wherein the first mixer and the first interference reduction circuit of the first channel are always used to generate the first mixed signal; and only one of the first sub-channel and the second sub-channel is enabled to generate the second mixed signal.

6. The multi-mixer system of claim 1, wherein the specific condition is that an Nth harmonic of the frequency of the oscillating signal used by the second mixer or the third mixer is substantially equal to a Mth harmonic of a frequency of another oscillating signal used by a mixer within another channel.

7. The multi-mixer system of claim 1, wherein the specific condition is that a summation of a harmonic of the frequency of the oscillating signal used by the second mixer or the third mixer and at least one of a harmonic of a frequency of another oscillating signal used by another channel is equal to a frequency of a mixed signal generated by the another channel.

8. The multi-mixer system of claim 1, wherein one of the first interference reduction circuit and the second interference reduction circuit is arranged to reduce harmonics from the mixer within a same channel to other channels.

9. The multi-mixer system of claim 1, wherein one of the first interference reduction circuit and the second interference reduction circuit is a low-pass filter, a band-pass filter or a notch filter.

10. The multi-mixer system of claim 1, wherein one of the first interference reduction circuit and the second interference reduction circuit is a bidirectional low-pass filter, a bidirectional band-pass filter or a bidirectional notch filter.

11. The multi-mixer system of claim 1, wherein one of the first interference reduction circuit and the second interference reduction circuit is an amplifier for providing reverse isolation.

12. A method for reducing interference within a multi-mixer system, wherein the multi-mixer system comprises:
an amplifier module, for receiving signals from at least an antenna to generate at least a first radio frequency (RF) input signal and a second RF input signal; and
a first channel coupled to the amplifier module, wherein the first channel comprises a mixer and receives the first RF input signal to generate a first mixed signal; and
a second channel coupled to the amplifier module, wherein the second channel is used to receive the second RF input signal to generate a second mixed signal, the second channel comprises a first sub-channel and a second sub-channel, the first sub-channel comprises a second mixer, and the second sub-channel comprises a third mixer;
and the method comprises:
reducing an interference of a first oscillating signal between the amplifier module and the first mixer;
selectively choosing one of the first sub-channel and the second sub-channel to generate the second mixed signal; and
selectively reducing or not reducing an interference of second oscillating signals used by the second channel, wherein if the first sub-channel of the second channel is enabled, reducing the interference of the second oscillating signal, and the second mixer of the first sub-channel generates the second mixed signal; and if the second sub-channel of the second channel is enabled, not reducing the interference of the second oscillating signal, and the third mixer of the first sub-channel generates the second mixed signal.

13. The method of claim 12, wherein the second oscillation signals used by the second mixer and the third mixer have a same frequency.

14. The method of claim 12, wherein the step of reducing the interference of the first oscillating signal between the amplifier module and the first mixer comprises:
always reducing the interference of the first oscillating signal to make the first mixer generate the first mixed signal.

15. The method of claim 12, wherein the step of selectively choosing one of the first sub-channel and the second sub-channel to generate the mixed signal comprises:
when the oscillating signal used by the second mixer or the third mixer satisfies a specific condition, enabling the first sub-channel to generate the mixed signal, and disables the second sub-channel; and
when the oscillating signal used by the second mixer or the third mixer does not satisfy the specific condition, disabling the first sub-channel, and enabling the second sub-channel to generate the second mixed signal.

16. The method of claim 15, wherein the specific condition is that an Nth harmonic of the frequency of the oscillating signal used by the second mixer or the third mixer is substantially equal to a Mth harmonic of a frequency of another oscillating signal used by a mixer within another channel.

17. The method of claim 15, wherein the specific condition is that a summation of a harmonic of the frequency of the oscillating signal used by the second mixer or the third mixer and at least one of a harmonic of a frequency of another oscillating signal used by another channel is equal to a frequency of a mixed signal generated by the another channel.

* * * * *